United States Patent
Kim et al.

(10) Patent No.: US 11,172,445 B2
(45) Date of Patent: Nov. 9, 2021

(54) METHOD FOR TRANSMITTING WAKE-UP PACKET USING IDENTIFICATION CHANGE PROCESS IN WIRELESS LAN SYSTEM AND APPARATUS THEREFOR

(71) Applicant: LG ELECTRONICS INC., Seoul (KR)

(72) Inventors: Sanggook Kim, Seoul (KR); Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 16/641,545

(22) PCT Filed: Aug. 24, 2018

(86) PCT No.: PCT/KR2018/009788
§ 371 (c)(1),
(2) Date: Feb. 24, 2020

(87) PCT Pub. No.: WO2019/039902
PCT Pub. Date: Feb. 28, 2019

(65) Prior Publication Data
US 2020/0229090 A1   Jul. 16, 2020

Related U.S. Application Data

(60) Provisional application No. 62/549,907, filed on Aug. 24, 2017.

(51) Int. Cl.
*H04W 52/02* (2009.01)
*H04L 27/02* (2006.01)
(Continued)

(52) U.S. Cl.
CPC ......... *H04W 52/0229* (2013.01); *H04L 27/02* (2013.01); *H04W 80/02* (2013.01); *H04W 84/12* (2013.01)

(58) Field of Classification Search
CPC . H04W 52/0229; H04W 80/02; H04W 84/12; H04W 52/0235; H04W 52/02;
(Continued)

(56) References Cited

U.S. PATENT DOCUMENTS

2016/0337973 A1   11/2016   Park et al.
2016/0374020 A1   12/2016   Azizi et al.
2018/0288706 A1*  10/2018   Fang ................ H04W 52/0235

FOREIGN PATENT DOCUMENTS

KR      20150068378      6/2015

OTHER PUBLICATIONS

Basagni, Stefano, Chiara Petrioli, and Dora Spenza. "CTP-WUR: The collection tree protocol in wake-up radio WSNs for critical applications." 2016 International Conference on Computing, Networking and Communications (ICNC). IEEE, 2016. (Year: 2016).*

(Continued)

*Primary Examiner* — Sharad Rampuria
(74) *Attorney, Agent, or Firm* — Lee, Hong, Degerman, Kang & Waimey

(57) ABSTRACT

A method for transmitting a packet, which is performed by a first wireless device in a wireless LAN system, according to the present invention comprises the steps of: receiving a wake-up packet; transmitting a first response request packet for a main radio module of a second wireless device and a second response request packet for a wake-up radio (WUR) module of the second wireless device; determining whether to change a WUR address field of the wake-up packet on the basis of a response message to the first response request packet or the second response request packet; and changing the WUR address field when it is determined that the WUR address field of the wake-up packet should be changed.

14 Claims, 20 Drawing Sheets

(a)

(b)

(51) Int. Cl.
*H04W 80/02* (2009.01)
*H04W 84/12* (2009.01)

(58) Field of Classification Search
CPC ....... H04W 52/46; H04L 27/02; Y02D 30/70;
H04B 10/293; H04B 10/294; H04B
10/296; H04B 10/564; H04J 14/0221
See application file for complete search history.

(56) References Cited

OTHER PUBLICATIONS

Blanckenstein, Johannes, Jirka Klaue, and Holger Karl. "A survey of low-power transceivers and their applications." IEEE Circuits and Systems Magazine 15.3 (2015): 6-17. (Year: 2015).*
PCT International Application No. PCT/KR2018/009788, International Search Report dated Nov. 20, 2018, 2 pages.
Park et al., "LP-WUR (Low-Power Wake-up Receiver) Follow-Up," IEEE 802.11-16/0341r0, Mar. 14, 2016, 10 pages.
Ryu et al., "Overall MAC Procedure for WUR," IEEE 802.11-16/1445r1, Nov. 7, 2016, 11 pages.

* cited by examiner

FIG. 1
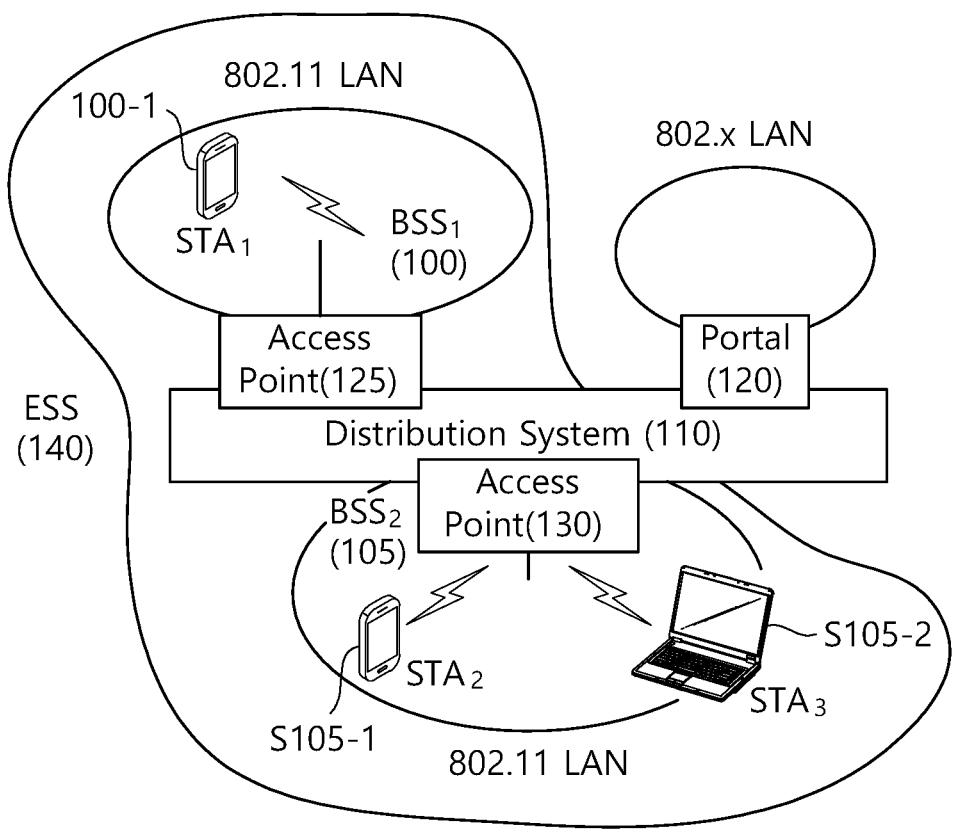
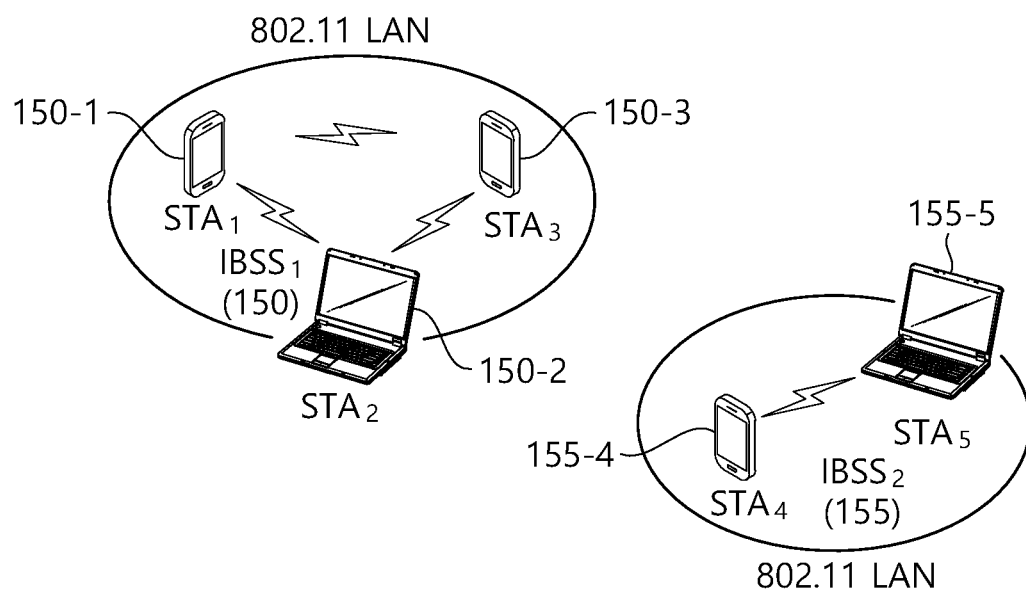

METHOD FOR TRANSMITTING WAKE-UP PACKET USING IDENTIFICATION CHANGE PROCESS IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2018/009788, filed on Aug. 24, 2018, which claims the benefit of U.S. Provisional Application No. 62/549,907, filed on Aug. 24, 2017, the contents of which are all hereby incorporated by reference herein in their entirety.

BACKGROUND OF THE DISCLOSURE

Field

The present disclosure relates to wireless communication and, more particularly, to a method for receiving a wake-up packet using an identification change process in a wireless LAN system and a transmission terminal using the same.

Related Art

Next-generation wireless local area network (WLAN) is under discussion. The next-generation WLAN aims at 1) enhancement of the Institute of Electronic and Electronics Engineers (IEEE) 802.11 physical (PHY) layer and medium access control (MAC) layer in 2.4 GHz and 5 GHz bands, 2) an increase in spectrum efficiency SIP1802-040 and area throughput, 3) enhancement of performance in real indoor and outdoor environments such as environments with interference sources, dense heterogeneous network environments, and environments with high user loads. In addition, a paradigm is shifting from human-oriented communication support to Internet of things (IoT), which requires the efficient use of power for things which are not available for supply of power at all times. Therefore, the IEEE has created a new task group (Task Group ba) to develop a standard protocol that enables communication using ultra-power consumption. Wireless devices based on this standard protocol are referred to as devices that support wake-up radio (WUR).

An environment considered mainly in the next-generation WLAN is a dense environment with many access points (APs) and stations (STAs), and improvement in spectrum efficiency and area throughput in such a dense environment are discussed. In addition, the next generation WLAN is concerned about improvement in substantial performance in an outdoor environment, which has not been much considered in the conventional WLAN, as well as an indoor environment.

Specifically, the next-generation WLAN pays much attention on scenarios such as wireless office, smart-home, stadium, hot spot, and building/apartment based on which enhancement of system performance in the dense environment with many Aps and STAs have been discussed.

Also, in the next generation WLAN, system performance improvement, outdoor environment performance, cellular offloading in an overlapping basic service set (OBSS) environment, and the like, rather than single link performance improvement in one basic service set (BSS), are expected to be actively discussed. Directionality of the next-generation WLAN means that the next-generation WLAN will increasingly have a technology range similar to that of mobile communications. Considering a recent situation in which mobile communication and WLAN technologies are discussed together in a small cell and direct-to-direct (D2D) communication area, technical and business convergence of the next-generation WLAN and mobile communication is anticipated to become more active.

SUMMARY

An object of the present disclosure is to provide a method and apparatus for transmitting a wake-up packet for providing a wake-up radio (WUR) operation in a wireless LAN system.

Another object of the present disclosure is to provide a method and apparatus for preventing waste of power using an identification change process for identifying and changing a wake-up packet.

According to an embodiment of the present disclosure, a method for transmitting a packet by a first wireless device in a wireless LAN system is provided. The method, performed by the first wireless device, includes: receiving a wake-up packet; transmitting a first response request packet for a main radio module of a second wireless device and a second response request packet for a wake-up radio (WUR) module of the second wireless device; determining whether to change a WUR address field of the wake-up packet based on a response message for the first response request packet or the second response request packet; and changing the WUR address field when it is determined that the WUR address field of the wake-up field is changed.

According to another embodiment of the present disclosure, a method for receiving a packet by a second wireless device in a wireless LAN system is provided. The method, performed by the second wireless device including a main radio module and a wake-up radio (WUR) module, includes: receiving a first response request packet for the main radio module of the second wireless device and a second response request packet for the WUR mode of the second wireless device; transmitting a response message for the first response request packet when the main radio module is turned on; transmitting a response message for the second response request packet when the WUR module is turned on; and receiving a wake-up packet including a changed WUR address field.

According to the present disclosure, a first wireless device of a user can determine whether a received wake-up packet has been transmitted from a device other than a legitimate second wireless device managed by the first wireless device, and thus the second wireless device can efficiently prevent waste of power caused by a wake-up packet received from a device other than the legitimate second wireless device.

According to the present disclosure, when a wake-up packet is received from a device other than the legitimate second wireless device managed by the first wireless device, a WUR address field of the wake-up packet can be changed. Accordingly, it is possible to efficiently prevent waste of power caused by the device other than the legitimate second wireless device.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
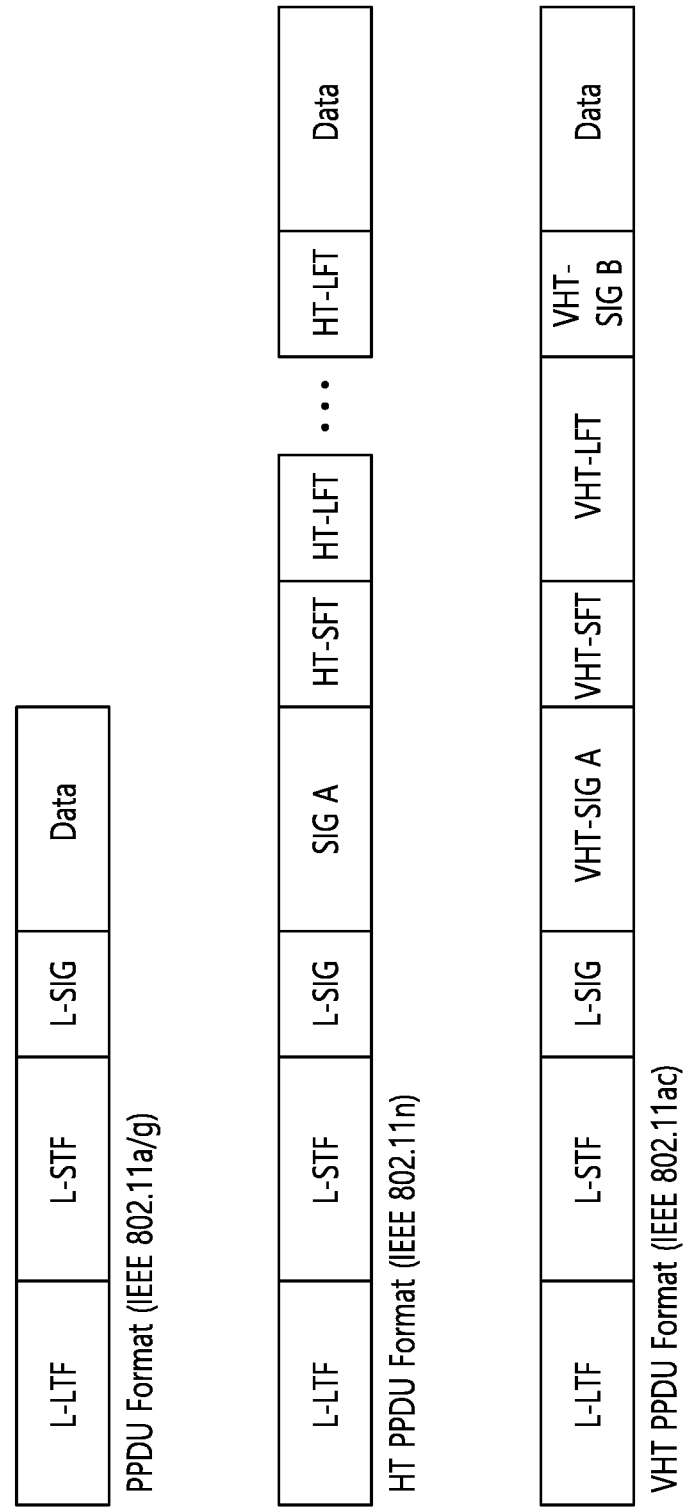
FIG. 2 is a diagram illustrating an example of a PPDU used in an IEEE standard.

The above-described features and the following detailed description are exemplary contents for helping a description and understanding of the present specification. That is, the present specification is not limited to this embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

FIG. 1 is a conceptual diagram illustrating a structure of a WLAN system. FIG. 1(A) illustrates a structure of an infrastructure network of institute of electrical and electronic engineers (IEEE) 802.11.

Referring to FIG. 1(A), a WLAN system 10 of FIG. 1(A) may include at least one basic service set (hereinafter, referred to as 'BSS') 100 and 105. The BSS is a set of access points (hereinafter, APs) and stations (hereinafter, STAs) that may successfully synchronize and communicate with each other and is not a concept indicating a specific area.

For example, a first BSS 100 may include a first AP 125 and one first STA 100-1. A second BSS 105 may include a second AP 130 and one or more STAs 105-1 and 105-2.

The infrastructure BSSs 100 and 105 may include at least one STA, APs 125 and 130 for providing a distribution service, and a distribution system (DS) 110 for connecting a plurality of APs.

The DS 110 may connect a plurality of BSSs 100 and 105 to implement an extended service set (hereinafter, 'ESS') 140. The ESS 140 may be used as a term indicating one network to which at least one AP 125 and 130 is connected through the DS 110. At least one AP included in one ESS 140 may have the same service set identification (hereinafter, SSID).

A portal 150 may serve as a bridge for connecting a WLAN network (IEEE 802.11) with another network (e.g., 802.X).

In a WLAN having a structure as illustrated in FIG. 1(A), a network between the APs 125 and 130 and a network between APs 125 and 130 and STAs 100-1, 105-1, and 105-2 may be implemented.

FIG. 1(B) is a conceptual diagram illustrating an independent BSS. Referring to FIG. 1(B), a WLAN system 15 of FIG. 1(B) may perform communication by setting a network between STAs without the APs 125 and 130, unlike FIG. 1(A). A network that performs communication by setting a network even between STAs without the APs 125 and 130 is defined to an ad-hoc network or an independent basic service set (hereinafter, 'BSS').

Referring to FIG. 1(B), an IBSS 15 is a BSS operating in an ad-hoc mode. Because the IBSS does not include an AP, there is no centralized management entity. Therefore, in the IBSS 15, STAs 150-1, 150-2, 150-3, 155-4, and 155-5 are managed in a distributed manner.

All STAs 150-1, 150-2, 150-3, 155-4, and 155-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the Institute of Electrical and Electronics Engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a Physical Service Data Unit (PSDU).

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
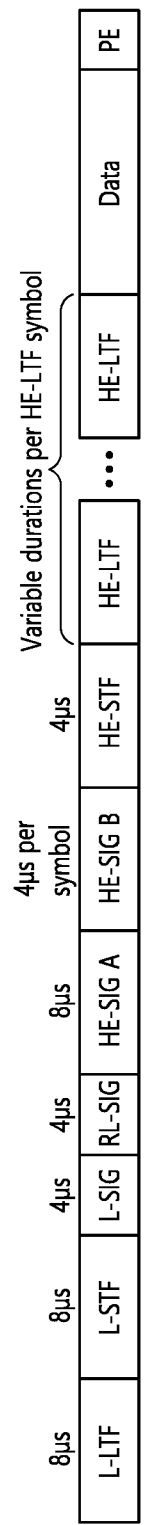
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

The PPDU used in the IEEE standard is mainly described as a PPDU structure transmitted with a channel bandwidth of 20 MHz. The PPDU structure transmitted with a bandwidth (e.g., 40 MHz and 80 MHz) wider than the channel bandwidth of 20 MHz may be a structure in which linear scaling is applied to the PPDU structure used in the channel bandwidth of 20 MHz.

The PPDU structure used in the IEEE standard may be generated based on 64 Fast Fourier Transforms (FTFs), and a cyclic prefix portion (CP portion) may be ¼ of an effective symbol interval. In this case, a length of an effective symbol interval (or FFT interval) may be 3.2 us, a CP length may be 0.8 us, and symbol duration may be 4 us (3.2 us+0.8 us) that adds the effective symbol interval and the CP length.

Figure 4:
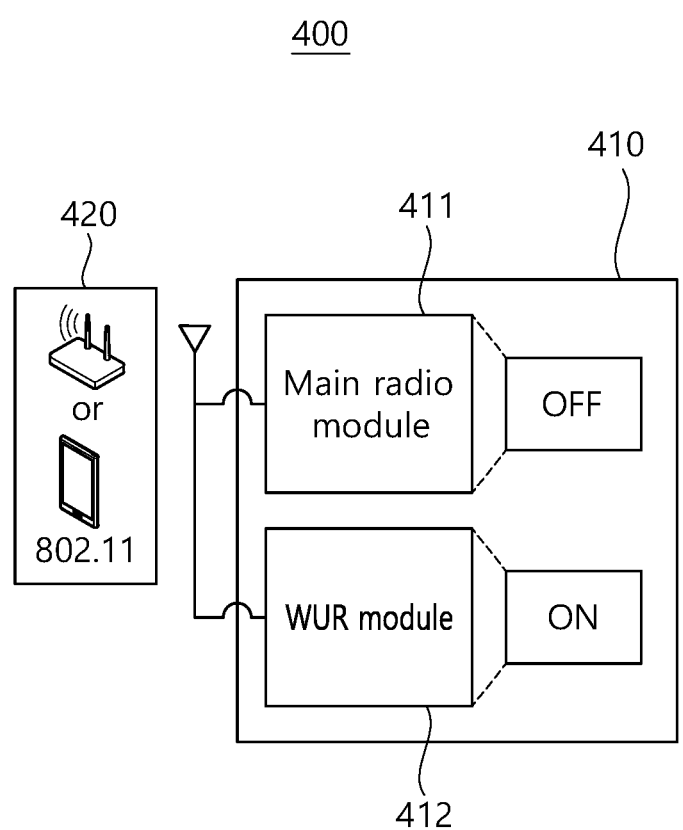
FIG. 4 is an internal block diagram of a wireless terminal receiving a wake-up packet.

FIG. 4 is an internal block diagram of a wireless terminal receiving a wake-up packet.

Referring to FIG. 4, a WLAN system 400 according to the present embodiment may include a first wireless terminal 410 and a second wireless terminal 420.

The first wireless terminal 410 may include a main radio module 411 related to main radio (i.e., 802.11) and a module 412 (hereinafter, WUR module) including a low-power wake-up receiver ('LP WUR'). The main radio module 411 may transmit or receive user data in an active state (i.e., ON state).

When there is no data (or packet) to be transmitted by the main radio module 411, the first radio terminal 410 may control the main radio module 411 to enter an inactive state (i.e., OFF state). For example, the main radio module 411 may include a plurality of circuits supporting Wi-Fi, Bluetooth® radio (hereinafter, BT radio), and Bluetooth® Low Energy radio (hereinafter, BLE radio).

In the related art, a wireless terminal operating based on a power save mode may operate in an active state or a sleep state.

For example, a wireless terminal in an active state may receive all frames from another wireless terminal. Further, a wireless terminal in a sleep state may receive a specific type of frame (e.g., a beacon frame transmitted periodically) transmitted by another wireless terminal (e.g., AP).

It is assumed that a wireless terminal described in the present specification may operate a main radio module in an active state or in an inactive state.

A wireless terminal including a main radio module 411 in an inactive state (i.e., OFF state) may not receive a frame (e.g., 802.11 type PPDU) transmitted by another wireless terminal (e.g., AP) until the main radio module is woken up by the WUR module 412.

For example, a wireless terminal including the main radio module 411 in an inactive state (i.e., OFF state) may not receive a beacon frame periodically transmitted by the AP.

That is, it may be understood that a wireless terminal including a main radio module (e.g., 411) in an inactive state (i.e., OFF state) according to the present embodiment is in a deep sleep state.

Further, a wireless terminal including the main radio module 411 in an active state (i.e., ON state) may receive a frame (e.g., 802.11 type PPDU) transmitted by another wireless terminal (e.g., AP).

Further, it is assumed that a wireless terminal described in the present specification may operate the WUR module in a turn-off state or in a turn-on state.

A wireless terminal including the WUR module 412 in a turn-on state may receive only a specific type of frame transmitted by other wireless terminals. In this case, the specific type of frame may be understood as a frame modulated by an on-off keying (OOK) modulation scheme to be described later with reference to FIG. 5.

A wireless terminal including the WUR module 412 in a turn-off state may not receive a specific type of frame transmitted by other wireless terminals.

In the present specification, in order to represent an ON state of a specific module included in the wireless terminal, terms of an active state and a turn-on state may be used interchangeably. In the same context, in order to represent an OFF state of a particular module included in the wireless terminal, terms of an inactive state and a turn-off state may be used interchangeably.

The wireless terminal according to the present embodiment may receive a frame (or packet) from another wireless terminal based on the main radio module 411 or the WUR module 412 in an active state.

The WUR module 412 may be a receiver for waking the main radio module 411. That is, the WUR module 412 may not include a transmitter. The WUR module 412 may maintain a turn-on state for duration in which the main radio module 411 is in an inactive state.

For example, when a wake-up packet (hereinafter, WUP) for the main radio module 411 is received, the first radio terminal 410 may control the main radio module 411 in an inactive state to enter an active state.

The low-power wake-up receiver (LP WUR) included in the WUR module 412 targets target power consumption of less than 100 uW in an active state. Further, the low-power wake-up receiver may use a narrow bandwidth of less than 5 MHz.

Further, power consumption by the low-power wake-up receiver may be less than 100 uW. Further, a target transmission range of the low-power wake-up receiver may be the same as that of existing 802.11.

The second wireless terminal 420 according to the present embodiment may transmit user data based on main radio (i.e., 802.11). The second wireless terminal 420 may transmit a wake-up packet (WUP) for the WUR module 412.

Referring to FIG. 4, the second wireless terminal 420 may not transmit user data or a wake-up packet (WUP) for the first wireless terminal 410. In this case, the main radio module 411 included in the second wireless terminal 420 may be in an inactive state (i.e., OFF state), and the WUR module 412 may be in a turn-on state (i.e., ON state).

Figure 5:
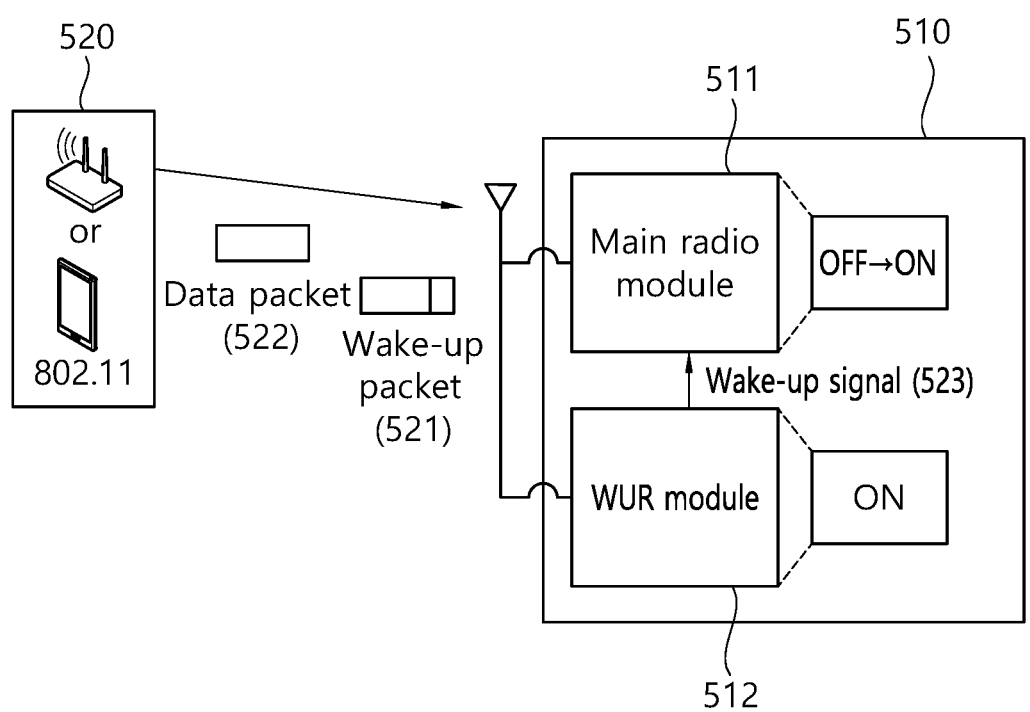
FIG. 5 is a conceptual diagram illustrating a method in which a wireless terminal receives a wake-up packet and a data packet.

FIG. 5 is a conceptual diagram illustrating a method in which a wireless terminal receives a wake-up packet and a data packet.

Referring to FIGS. 4 and 5, a WLAN system 500 according to the present embodiment may include a first wireless terminal 510 corresponding to a receiving terminal and a second wireless terminal 520 corresponding to a transmitting terminal. A basic operation of the first wireless terminal 510 of FIG. 5 may be understood through a description of the first wireless terminal 410 of FIG. 4. Similarly, a basic operation of the second wireless terminal 520 of FIG. 5 may be understood through a description of the second wireless terminal 420 of FIG. 4.

Referring to FIG. 5, when a wake-up packet 521 is received in a WUR module 512 in an active state, the WUR module 512 may transfer a wake-up signal 523 to a main radio module 511 so that the main radio module 511 may accurately receive a data packet 522 to be received after the wake-up packet 521.

For example, the wake-up signal 523 may be implemented based on primitive information inside the first wireless terminal 510.

For example, when the main radio module 511 receives the wake-up signal 523, the main radio module 511 may activate all or only a part of a plurality of circuits (not illustrated) supporting Wi-Fi, BT radio, and BLE radio included therein.

As another example, actual data included in the wake-up packet 521 may be directly transferred to a memory block (not illustrated) of the receiving terminal even if the main radio module 511 is in an inactive state.

As another example, when the wake-up packet 521 includes an IEEE 802.11 MAC frame, the receiving terminal may activate only a MAC processor of the main radio module 511. That is, the receiving terminal may maintain a PHY module of the main radio module 511 in an inactive state. The wake-up packet 521 of FIG. 5 will be described in more detail with reference to the following drawings.

The second wireless terminal 520 may be set to transmit the wake-up packet 521 to the first wireless terminal 510. For example, the second wireless terminal 520 may control the main radio module 511 of the first wireless terminal 510 to enter an active state (i.e., ON state) according to the wake-up packet 521.

Figure 6:
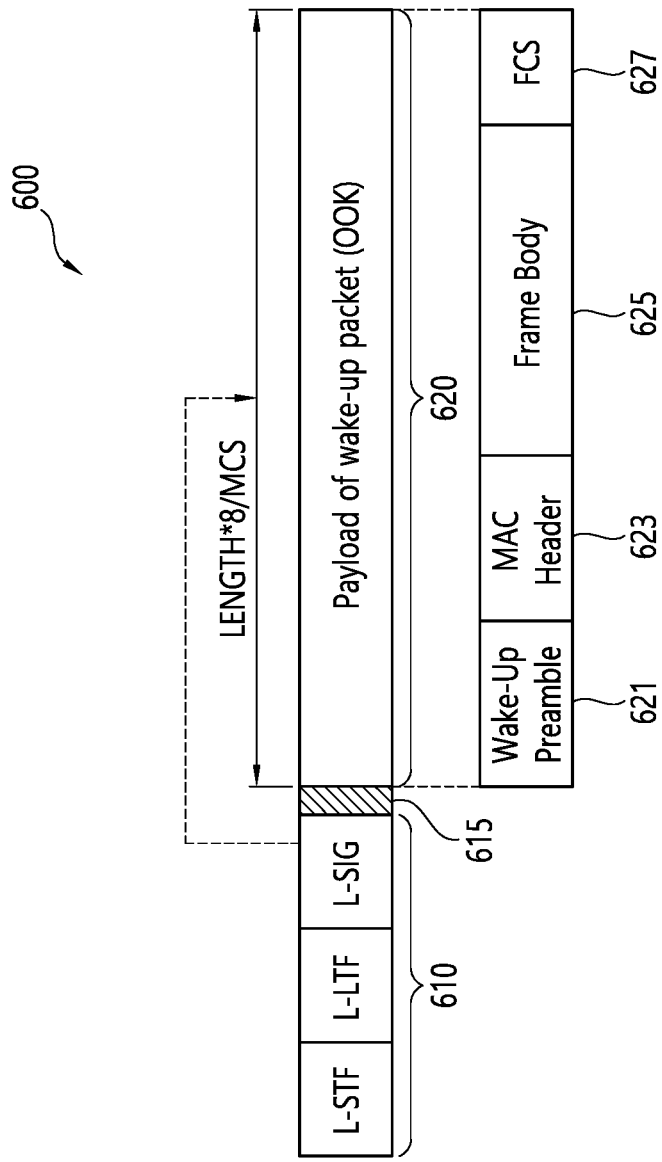
FIG. 6 illustrates an example of a format of a wake-up packet.

FIG. 6 shows an example of a format of a wake-up packet.

Referring to FIGS. 1 to 6, a wake-up packet 600 may include at least one legacy preamble 610. For example, the legacy preamble 610 may be modulated according to an existing orthogonal frequency division multiplexing (OFDM) modulation technique.

In addition, the wake-up packet 600 may include a payload 620 after the legacy preamble 610. For example, the payload 620 may be modulated according to a simple modulation scheme (e.g., on-off Keying (OOK) modulation scheme). The wake-up packet 600 including the payload may be transmitted based on a relatively small bandwidth.

Referring to FIGS. 1 to 6, the second wireless terminal (e.g., 520) may be configured to generate and/or transmit wake-up packet 521 or 600. The first wireless terminal (e.g., 510) may be configured to process the received wake-up packet 521.

The wake-up packet 600 may include the legacy preamble 610 or any other preamble (not shown) defined in the existing IEEE 802.11 standard.

The wake-up packet 600 may include one packet symbol 615 after the legacy preamble 610. In addition, the wake-up packet 600 may include a payload 620.

The legacy preamble 610 may be provided for coexistence with a legacy STA. In other words, the legacy preamble 610 may be provided for a third party STA (i.e., a STA that does not include an LP-WUR). That is, the legacy preamble 610 may not be decoded by the WUR terminal including the WUR module.

In the legacy preamble 610 for coexistence, an L-SIG field for protecting a packet may be used. For example, an 802.11 STA may detect a start portion of a packet (i.e., a start portion of a wake-up packet) through an L-STF field in the legacy preamble 610. The 802.11 STA may know a last portion of the packet (i.e., a last portion of the wake-up packet) through the L-SIG field in the legacy preamble 610.

In order to reduce a false alarm of the 802.11n terminal, a modulated symbol 615 may be added after the L-SIG of FIG. 6. One symbol 615 may be modulated according to a biphase shift keying (BPSK) scheme. The one symbol 615 may have a length of 4 us. The one symbol 615 may have a 20 MHz bandwidth like a legacy part.

The payload 620 may include a wake-up preamble field 621, a MAC header field 623, a frame body field 625, and a frame check sequence (FCS) field 627.

The wake-up preamble field 621 may include a sequence for identifying the wake-up packet 600. For example, the wake-up preamble field 621 may include a pseudo-random noise (PN) sequence.

A MAC header field 624 may include address information (or an identifier of a receiving apparatus) indicating a receiving terminal receiving the wake-up packet 600. The frame body field 626 may include other information of the wake-up packet 600.

The frame body 626 may include length information or size information of the payload. Referring to FIG. 6, the length information of the payload may be calculated based on length information and MCS information included in the legacy preamble 610.

The FCS field 628 may include a cyclic redundancy check (CRC) value for error correction. For example, the FCS field 628 may include a CRC-8 value or a CRC-16 value for the MAC header field 623 and the frame body 625.

Figure 7:
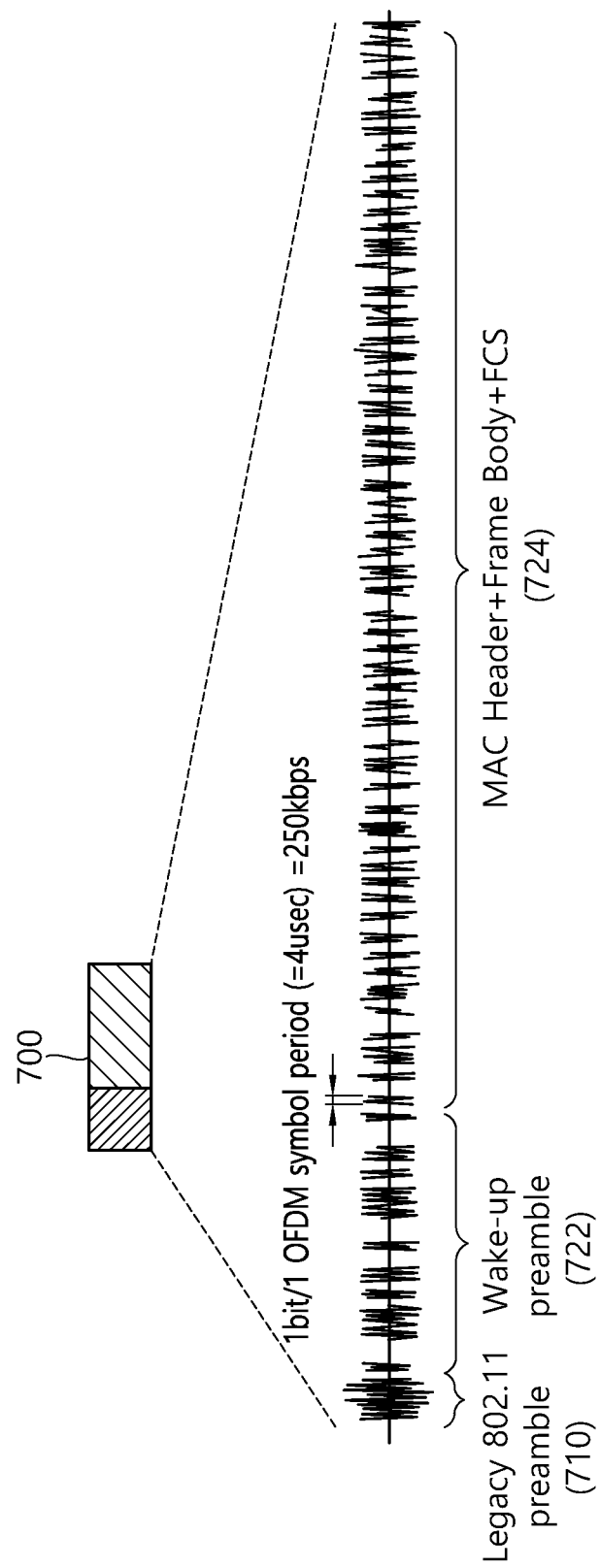
FIG. 7 illustrates a signal waveform of a wake-up packet.

FIG. 7 illustrates a signal waveform of a wake-up packet.

Referring to FIG. 7, a wake-up packet 700 may include a legacy preamble (802.11 preamble) 710 and payloads 722 and 724 modulated based on an On-Off Keying (OOK) technique. That is, the wake-up packet WUP according to the present embodiment may be understood in a form in which a legacy preamble and a new LP-WUR signal waveform coexist.

An OOK technique may not be applied to the legacy preamble 710 of FIG. 7. As described above, the payloads 722 and 724 may be modulated according to the OOK technique. However, the wake-up preamble 722 included in the payloads 722 and 724 may be modulated according to another modulation technique.

For example, it may be assumed that the legacy preamble 710 is transmitted based on a channel band of 20 MHz to which 64 FFTs are applied. In this case, the payloads 722 and 724 may be transmitted based on a channel band of about 4.06 MHz.

Figure 8:
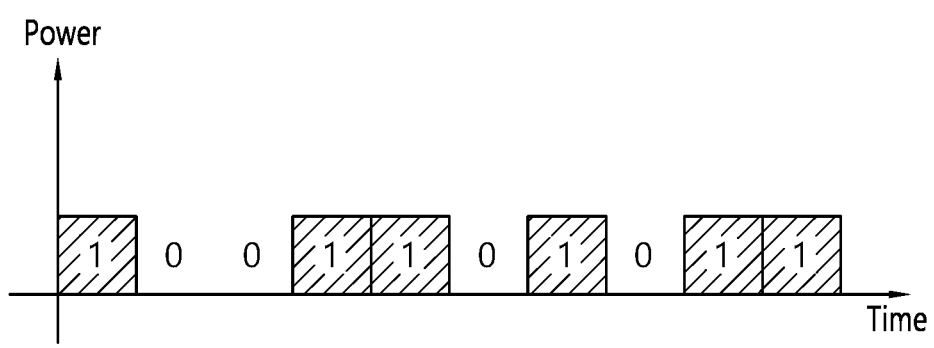
FIG. 8 is a diagram illustrating a procedure of determining power consumption according to a ratio of a bit value constituting information of a binary sequence form.

FIG. 8 is a diagram illustrating a procedure of determining power consumption according to a ratio of bit values constituting information of a binary sequence form.

Referring to FIG. 8, information of a binary sequence form having '1' or '0' as a bit value may be represented. Communication according to an OOK modulation scheme may be performed based on bit values of information of a binary sequence form.

For example, when a light emitting diode is used for visible light communication, if a bit value constituting information of a binary sequence form is '1', the light emitting diode may be turned on, and if a bit value constituting information of a binary sequence form is '0', the light emitting diode may be turned off.

As the light emitting diode blinks, the receiver receives and restores data transmitted in the form of visible light, thereby enabling communication using visible light. However, because blinking of the light emitting diode may not be recognized by the human eye, the person feels that lighting is continuously maintained.

For convenience of description, as illustrated in FIG. 8, information of a binary sequence form having 10 bit values may be provided. For example, information of a binary sequence form having a value of '1001101011' may be provided.

As described above, when the bit value is '1', if the transmitting terminal is turned on and when the bit value is '0', if the transmitting terminal is turned off, symbols corresponding to 6 bit values of the above 10 bit values are turned on.

Because the wake-up receiver WUR according to the present embodiment is included in the receiving terminal, transmission power of the transmitting terminal may not be greatly considered. The reason why an OOK technique is used in the present embodiment is because power consumption in a decoding procedure of a received signal is very small.

Until a decoding procedure is performed, there may be no significant difference between power consumed by the main radio and power consumed by the WUR. However, as a decoding procedure is performed by the receiving terminal, a large difference may occur between power consumed by the main radio module and power consumed by the WUR module. The following description is approximate power consumption.

Existing Wi-Fi power consumption is about 100 mW. Specifically, power consumption of resonator+oscillator+PLL (1500 uW)→LPF (300 uW)→ADC (63 uW)→decoding processing (OFDM receiver) (100 mW) may occur.

WUR power consumption is about 100 uW. Specifically, power consumption of decoding processing by an OOK demodulator may occur.

Figure 9:
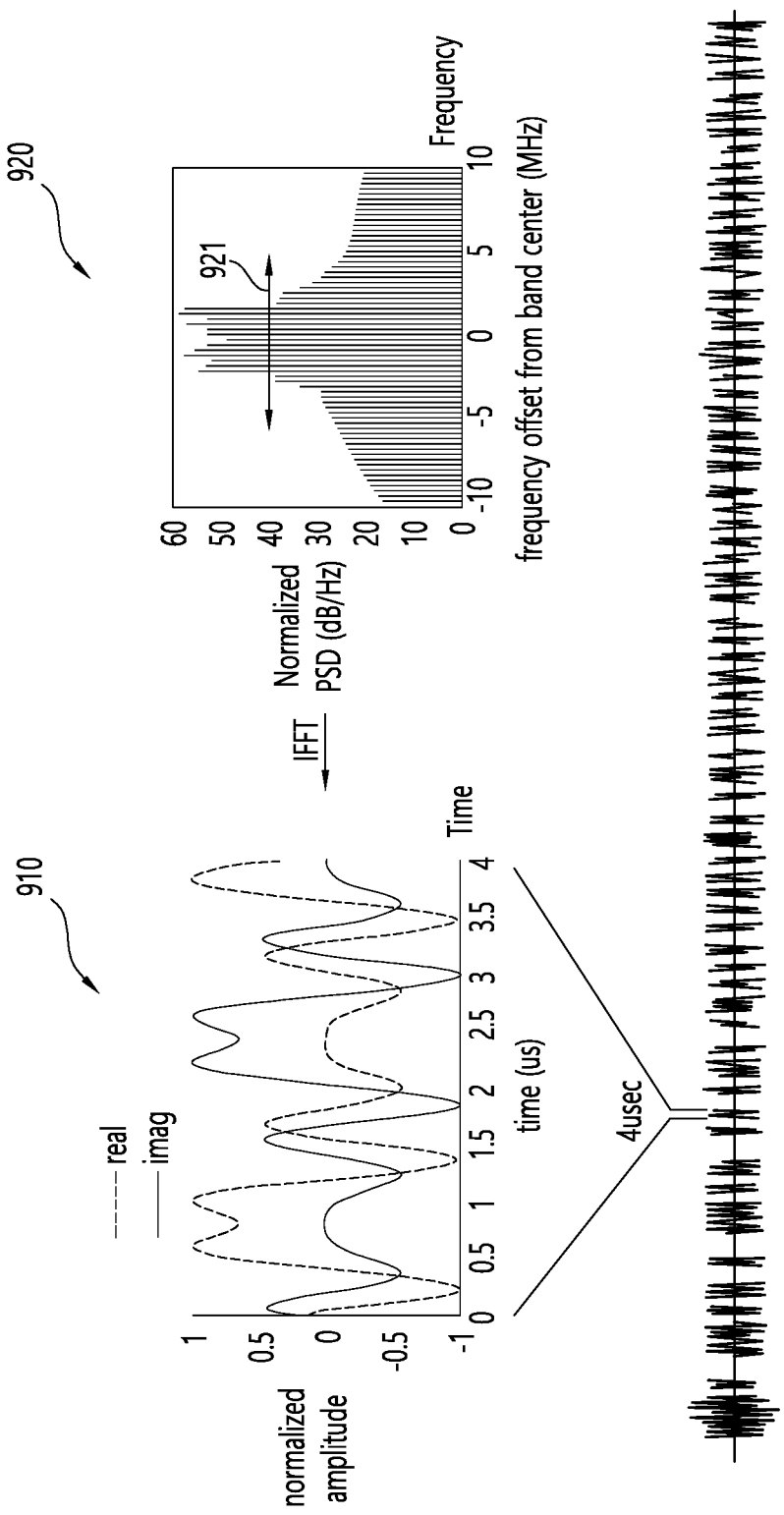
FIG. 9 is a diagram illustrating a design process of a pulse according to an OOK technique.

FIG. 9 is a diagram illustrating a design process of a pulse according to the OOK technique.

The wireless terminal according to the present embodiment may use an OFDM transmitting apparatus of the existing 802.11 to generate a pulse according to the OOK technique. The OFDM transmitting apparatus of the existing 802.11 may generate a sequence having 64 bits by applying 64-point IFFT.

Referring to FIGS. 1 to 9, the wireless terminal according to the present embodiment may transmit a payload of a wake-up packet (WUP) modulated according to the OOK technique. The payload (e.g., 620 of FIG. 6) according to the present embodiment may be implemented based on an ON time signal and an OFF time signal.

The OOK technique may be applied to the ON time signal included in the payload (e.g., 620 of FIG. 6) of the wake-up packet (WUP). In this case, the on time signal may be a signal having an actual power value.

Referring to a frequency domain graph 920, the ON time signal included in the payload (e.g., 620 of FIG. 6) may be obtained by performing IFFT on N2 (N2 is a natural number) subcarriers among N1 (N1 is a natural number) subcarriers corresponding to a channel band of the wake-up packet (WUP). In addition, a predetermined sequence may be applied to the N2 subcarriers.

For example, the channel band of the wake-up packet (WUP) may be 20 MHz. N1 subcarriers may be 64 subcarriers, and the N2 subcarriers may be 13 consecutive subcarriers (921 of FIG. 9). The subcarrier interval applied to the wake-up packet (WUP) may be 312.5 kHz.

The OOK technique may be applied to the OFF time signal included in the payload (e.g., 620 of FIG. 6) of the wake-up packet (WUP). The OFF time signal may be a signal that does not have an actual power value. That is, the OFF time signal may not be considered in the configuration of the wake-up packet WUP.

The ON time signal included in the payload (620 of FIG. 6) of the wake-up packet (WUP) may be determined (i.e., demodulated) as a 1-bit ON signal (i.e., '1') by the WUR module (e.g., 512 of FIG. 5). Similarly, the OFF time signal included in the payload may be determined (i.e., demodulated) as a 1-bit OFF signal (i.e., '0') by the WUR module (e.g., 512 of FIG. 5).

A specific sequence may be previously set for a subcarrier set 921 of FIG. 9. In this case, the preset sequence may be a 13-bit sequence. For example, a coefficient corresponding to a DC subcarrier of the 13-bit sequence may be '0', and remaining coefficients may be set to '1' or '−1'.

Referring to the frequency domain graph 920, the subcarrier set 921 may correspond to subcarriers having subcarrier indices of '−6' to '+6'.

For example, a coefficient corresponding to the subcarriers having subcarrier indices of '−6' to '−1' in the 13-bit sequence may be set to '1' or '−1'. A coefficient corresponding to the subcarriers having subcarrier indices of '1' to '6' in the 13-bit sequence may be set to '1' or '−1'.

For example, a subcarrier having a subcarrier index of '0' in the 13-bit sequence may be nulled. The coefficients of the remaining subcarriers (subcarrier indices '−32' to '−7' and subcarrier indices '+7' to '+31') except for the subcarrier set 921 may all be set to '0'.

The subcarrier set 921 corresponding to 13 contiguous subcarriers may be set to have a channel bandwidth of about 4.06 MHz. That is, power based on a signal may concentrate on 4.06 MHz in a 20 MHz band for the wake-up packet (WUP).

When a pulse based on the OOK technique is used according to the present embodiment, a signal to noise ratio (SNR) may be increased as power concentrates in a specific band, and power consumption for conversion in an AC/DC converter of a receiving apparatus may be advantageously reduced. Since a sampling frequency band is reduced to 4.06 MHz, power consumption by the wireless terminal may be reduced.

Another OFDM transmitting apparatus of 802.11 according to the present embodiment may perform IFFT (e.g. 64-point IFFT) on N2 (e.g., 13) subcarriers among N1 (e.g., 64) subcarriers corresponding to the channel band (e.g., 20 MHz band) of the wake-up packet.

In this case, a preset sequence may be applied to the N2 subcarriers. Accordingly, one ON signal may be generated in a time domain. 1-bit information corresponding to the one ON signal may be transmitted through one symbol.

For example, when the 64-point IFFT is performed, a symbol having a 3.2 us length corresponding to the subcarrier set 921 may be generated. In addition, when cyclic prefix (CP) (0.8 us) is added to a symbol having a length of 3.2 us corresponding to the subcarrier set 921, one symbol having a total length of 4 us as shown in the time domain graph 910 of FIG. 9 may be generated.

In addition, the OFDM transmitting apparatus of 802.11 may not transmit the OFF signal at all.

According to the present embodiment, the first wireless terminal (e.g., 510 of FIG. 5) including the WUR module (e.g., 512 of FIG. 5) may demodulate a received packet based on an envelope detector extracting an envelope of a received signal.

For example, the WUR module (e.g., 512 of FIG. 5) according to the present embodiment may compare a power level of the received signal obtained through the envelope of the received signal with a preset threshold level.

If the power level of the received signal is higher than the threshold level, the WUR module (e.g., 512 of FIG. 5) may determine the received signal as a 1-bit ON signal (i.e., '1'). If the power level of the received signal is lower than the threshold level, the WUR module (e.g., 512 of FIG. 5) may determine the received signal as a 1-bit OFF signal (i.e., '0').

According to the present embodiment, a basic data rate of one information may be 125 Kbps (8 us) or 62.5 Kbps (16 us).

When the contents of FIG. 9 is generalized, each signal having a length of K (e.g., K is a natural number) in a 20 MHz band may be transmitted based on K contiguous subcarriers among 64 subcarriers for the 20 MHz band. For example, K may correspond to the number of subcarriers used to transmit the signal. K may also correspond to a bandwidth of a pulse based on the OOK technique.

The coefficients of the subcarriers excluding the K subcarriers among the 64 subcarriers may all be set to '0'.

Specifically, the same K subcarriers may be used for the 1-bit OFF signal (hereinafter, information 0) corresponding to '0' and the 1-bit ON signal (hereinafter, information 1) corresponding to '1'. For example, indices for the K subcarriers in use may be expressed as 33-floor(K/2): 33+ceil (K/2)−1.

In this case, the information 1 and the information 0 may have the following values.

information 0=zeros(1, K)
information 1=alpha*ones(1, K)

The alpha is a power normalization factor and may be, for example, 1/sqrt(K).

Meanwhile, in the current home appliance industry, Internet of things (IOT) devices have rapidly been increased across different networks from daily home appliances to complex biosensors. In other words, IOT devices have become part of daily life. Also, people expected to be surrounded by 1 billion IOT devices soon.

Therefore, low power consumption and low latency may be required for the IOT devices.

Figure 10:
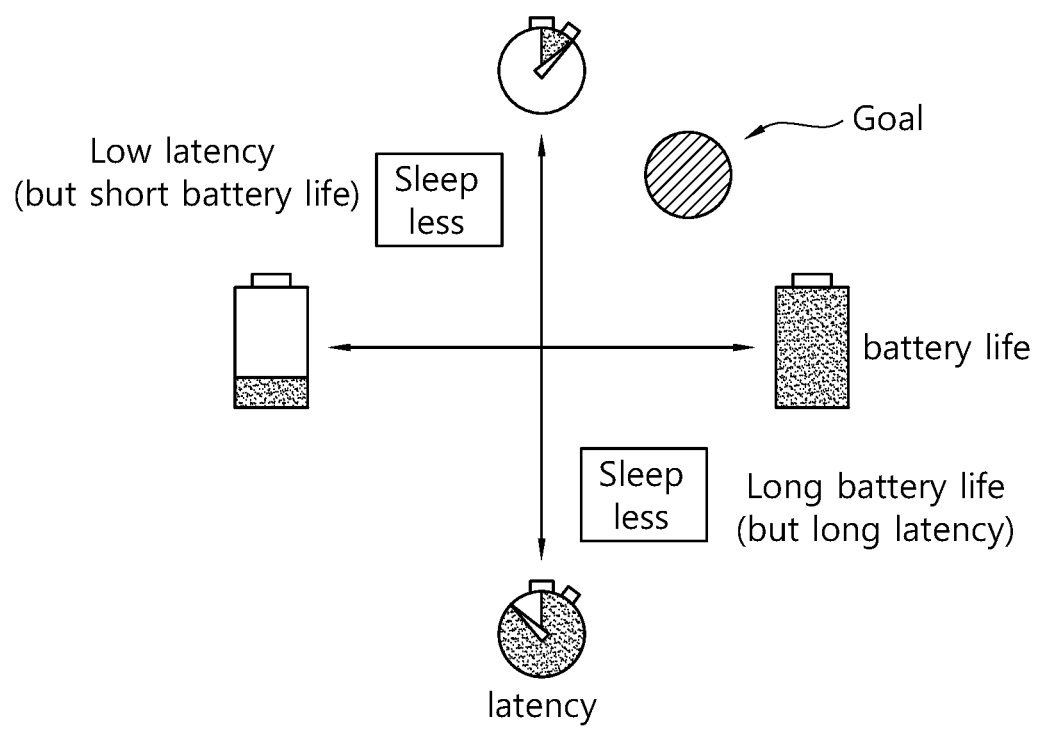
FIG. 10 is a diagram of a duty cycle trap.

FIG. 10 is a diagram for a duty cycle trap. Although low power consumption and low latency are required for IOT devices, referring to FIG. 10, the low power consumption and low latency are conflicting targets. That is, to increase a battery life of the IOT device, a sleep state may need to be longer. In other words, more latency may be required. In addition, in order to receive data with low latency of the IOT device, the sleep state may need to be maintained smaller. In this case, the battery life of the IOT device may be shortened. This operation may be referred to as a duty-cycled operation or a duty cycle trap.

Figure 11:
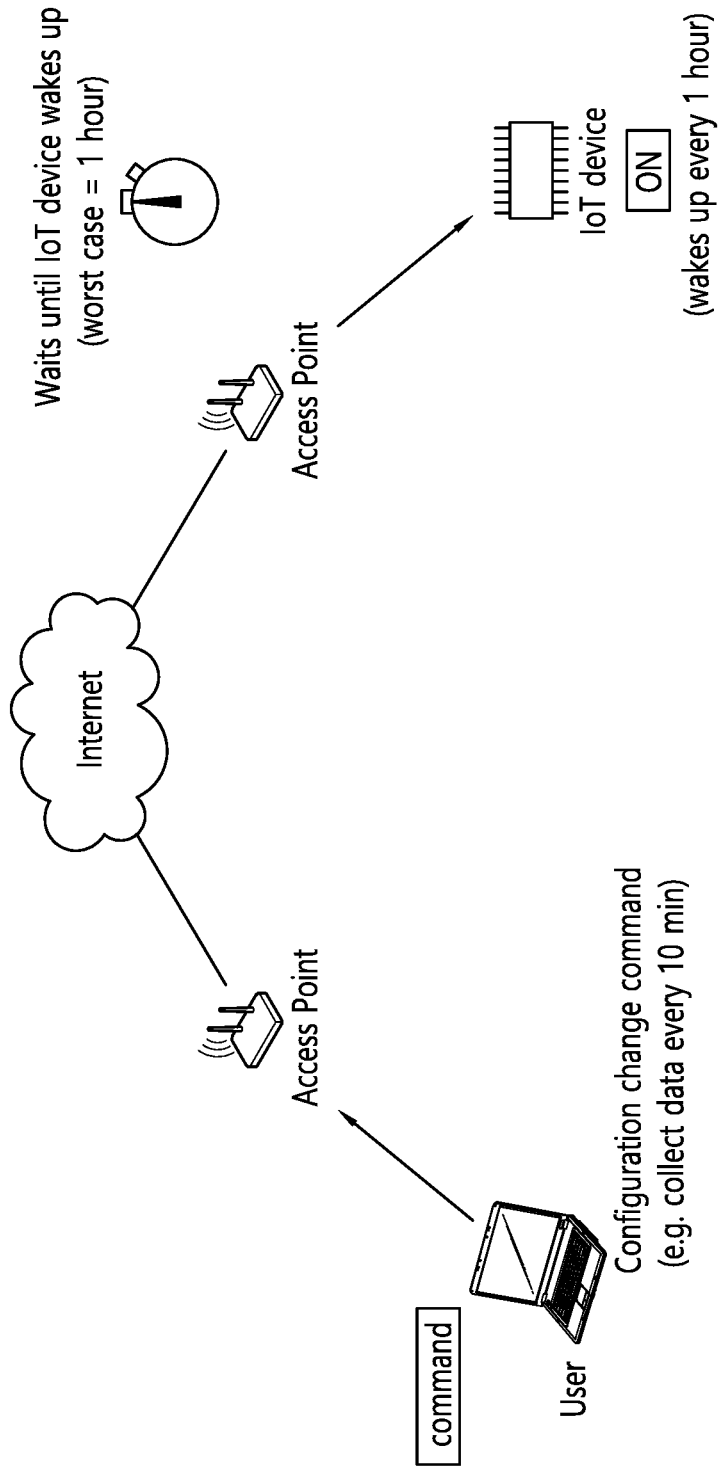
FIG. 11 is a diagram illustrating an IoT device in which a low power (or low energy) wake-up receiver described above is not used.

FIG. 11 illustrates an IOT device in which a low power wake-up receiver described above is not used. Referring to FIG. 11, when the low-energy wake-up receiver described above is not used for the IOT devices, the user may not access the IOT device while the IOT device is turned off to save battery. The user must wait until the IOT device wakes up, i.e., until the IOT device is activated. As shown in FIG. 11, when the IOT device wakes up hourly, that is, becomes active, the user may need to wait up to one hour before accessing the IOT device.

Therefore, in order to solve the problem described above, the IOT device including the low power wake-up receiver and the main radio module may be used. The low power wake-up receiver, as a receiver for receiving the wake-up packet as described above, may control the main radio module to enter an inactive state (i.e., an OFF state). The low power wake-up receiver may operate in an active state when the main radio module is in an inactive state (i.e., an OFF state), and the low power wake up receiver aims at consumption of less than 100 uW of target power in the active state. When an IOT device including the low power wake-up receiver is used, the user may access the IoT device with a short standby time and the IoT device may have a long battery life.

The wake-up radio (WUR) described above has been proposed as an essential method or device for reducing unnecessary power waste in the IoT era. In future communications, power saving through WUR may be important, which came into prominence in the industry and academia regarding key communication areas (e.g., LTE, 5G, Wi-Fi, LAA-LTE, IoT, etc.), vehicle-to-everything (V2X) services, and applications and is still actively discussed.

One of main IoT applications is agriculture, and when status information about animals and plants is appropriately used and processed, agricultural productivity can be considerably increased and natural environmental pollution can be reduced. Accordingly, a method for efficiently managing power consumption of an apparatus using a battery with a limited capacity in IoT application is required.

Figure 12:
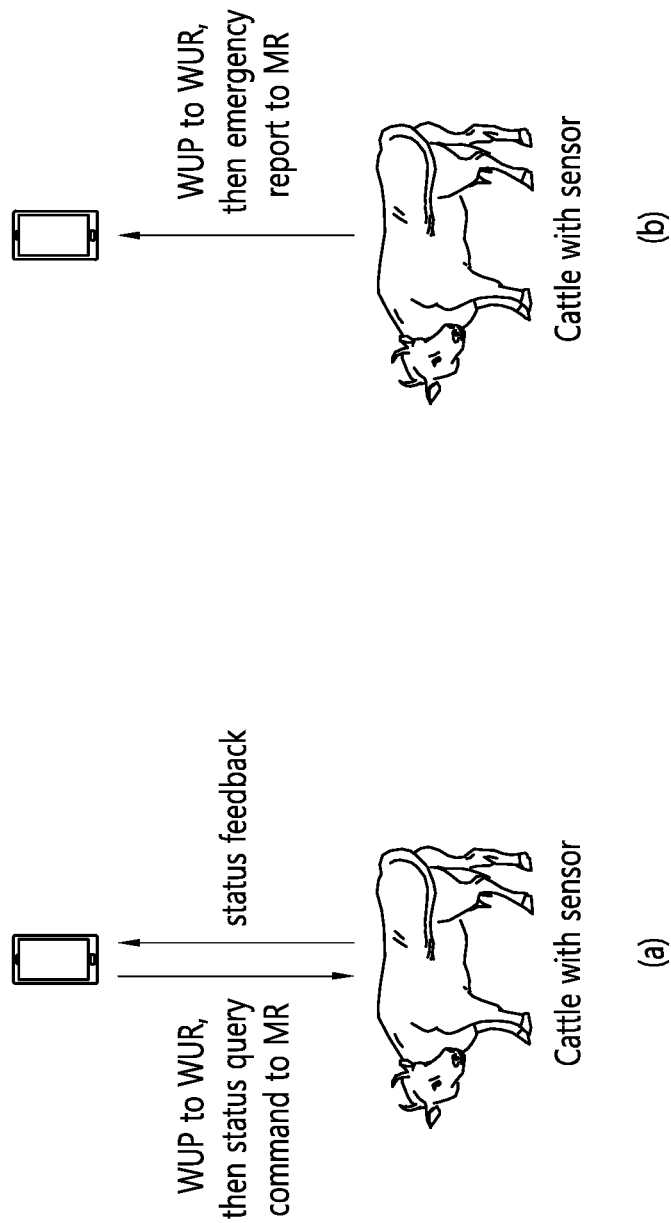
FIG. 12 illustrates an example of using IoT devices in the field of agriculture.

FIG. 12 illustrates an example of using IoT devices in the field of agriculture. FIG. 12 illustrates one of use models considered in IEEE 802.11 TGba. Referring to FIG. 12, many cattle in an open meadow can be controlled using a portable device (IoT device) such as a smartphone.

For example, referring to FIG. 12(a), a mobile AP can transmit a wake-up packet to a wake-up radio (WUR) module of a sensor attached to cattle. When a main radio module of the sensor wakes up through the wake-up packet, that is, when the main radio module is turned on, the mobile AP can transmit a status query command to the sensor and the sensor can transmit a feedback with respect to the status query command. Here, the status query command may be a request for a temperature and/or a position and the feedback may be a report for the request.

Referring to FIG. 12(b), when an emergency or critical event has occurred with respect to the cattle, the sensor attached to the cattle can transmit a wake-up packet to the mobile AP. When a main radio module of the mobile AP wakes up through the wake-up packet, that is, when the main radio module is turned on, the sensor can transmit a message with respect to the emergency or critical event to the mobile AP. To provide the aforementioned function, wake-up packet transmission may coexist with legacy IEEE 802.11 devices using the same band, a channel band of the wake-up packet (WUP) may be equal to or less than 20 MHz that is the minimum support range of IEEE 802.11 signals.

When IoT devices to which WUR is applied are used as described above, frequent and successive accesses may be attempted by a device managed by an attacker with malicious intention, and thus IoT devices (e.g., smartphones) rapidly consume power and a function of using the IoT devices, and the like in the above-described field of agriculture may not be normally executed.

Figure 13:
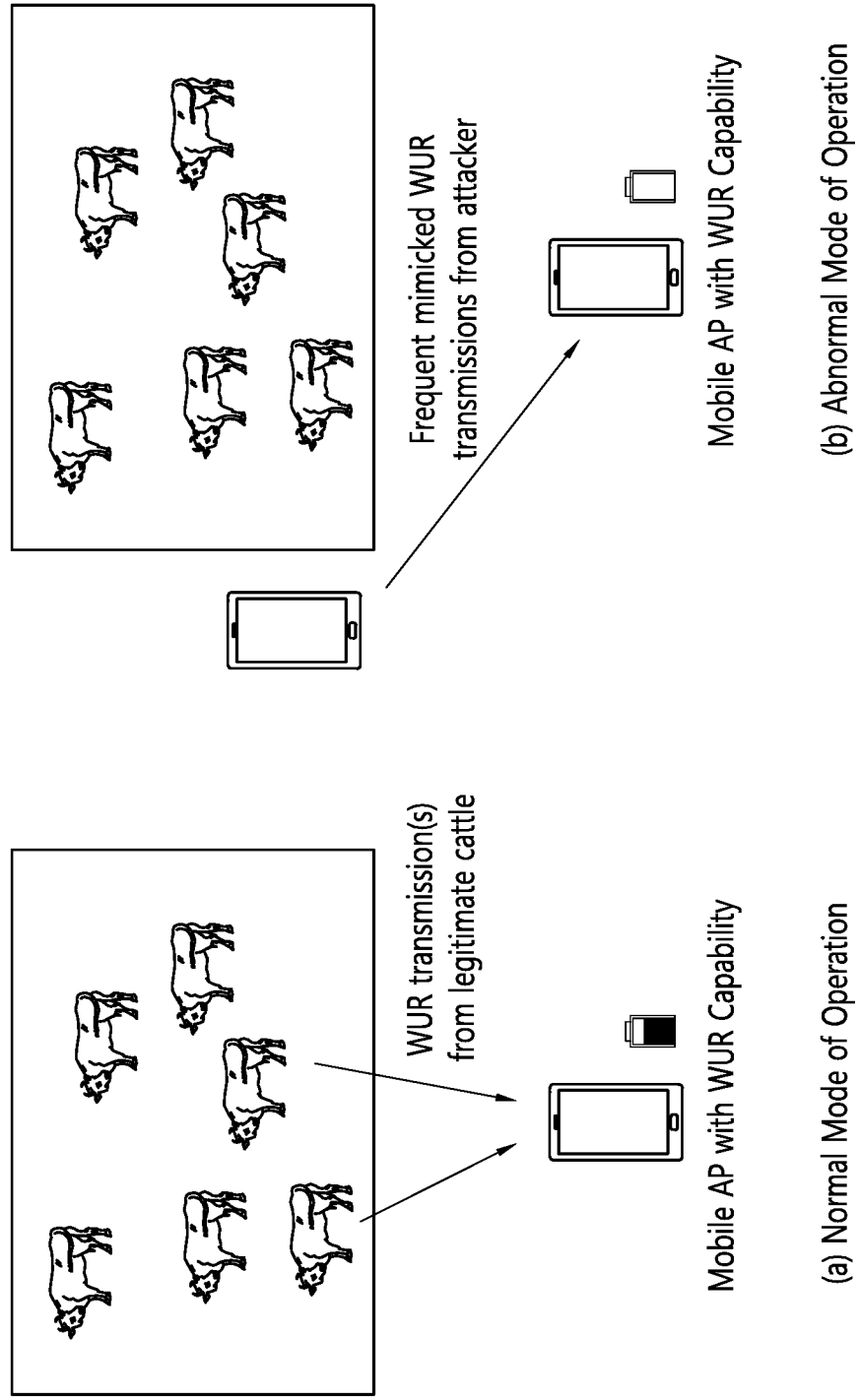
FIG. 13 illustrates an example in which a process of using IoT devices is obstructed by an attacker.

FIG. 13 illustrates an example in which a process of using IoT devices is obstructed by an attacker. Referring to FIG. 13(a), a user can manage a plurality of WUR devices through a mobile terminal such as a smartphone. Here, the plurality of WUR devices may be sensors attached to cattle and a WUR device may include a WUR module and a main radio module. On the other hand, a device of an attacker with malicious intention may mimic a wake-up packet transmitted from the WUR device and frequently transmit the mimicked wake-up packet to the terminal of the user and thus the power of the terminal of the user can be rapidly consumed, as illustrated in FIG. 13(b). Specifically, the main radio module (e.g., main WLAN module) of the device of the attacker can transmit the same wake-up packet as that sent from WUR devices attached to the cattle. The mobile terminal of the user can receive the wake-up packet and operate the main radio module (e.g., main WLAN module) of the terminal in an activated state. In this case, the main radio module of the mobile terminal can generate a message and transmit the message to WUR devices attached to legitimate cattle managed by the mobile terminal through an RF signal. However, since the wake-up packet is transmitted from the device of the attacker and the main radio modules of the WUR devices attached to the cattle are turned off, the WUR devices do not receive the message. When such a situation is repeated, waste of power of the mobile terminal of the user may occur.

The present disclosure proposes a method for preventing waste of power caused by a wake-up packet mimicked by the device of the attacker.

Specifically, the WUR module of the mobile terminal (e.g., smartphone) of the user can receive and process a wake-up packet and the main radio module can operate in a wake-up state according to the WUR module. The main radio module can check the source (i.e., a transmission terminal), destination, contents and integrity of the wake-up packet transmitted from the WUR module.

When the wake-up packet has been transmitted from a non-legitimate source, the mobile terminal can ignore the wake-up packet, the main radio module can operate in a turn-off state, and the WUR module can operate in a turn-on state.

When the wake-up packet has been transmitted from a legitimate source, the wake-up packet may be one of two cases. For example, the wake-up packet may be a wake-up packet transmitted from a legitimate WUR device (e.g., a WUR device attached to cattle). In this case, the main radio module of the legitimate WUR device can operate in a turn-on state and the WUR module of the legitimate WUR device can operate in a turn-off state because it already has transmitted the wake-up packet.

As another example, the wake-up packet may be a wake-up packet transmitted from a device of a malicious attacker which mimics a wake-up packet of a legitimate WUR device. In this case, the legitimate WUR device (e.g., WUR device attached to cattle) maintains a power saving mode, the main radio module of the legitimate WUR device can operate in a turn-off state, and the WUR module of the legitimate WUR device can operate in a turn-on state because it has not transmitted the wake-up packet.

To ascertain which one of the two cases corresponds a wake-up packet, the mobile terminal of the user can transmit two packets including a packet for the main radio module of a WUR device (e.g., WUR device attached to cattle) with respect to a legitimate source and a packet for the WUR module of the WUR device to the WUR device. These signals can be sequentially transmitted. The packet for the main radio module may be referred to as a first response packet and the packet for the WUR module may be referred to as a second response packet. Here, the packet for the WUR module may be transmitted first and then the packet for the main radio module may be transmitted. Alternatively, the packet for the main radio module may be transmitted first and then the packet for the WUR module may be transmitted.

Further, the packets may be simultaneously transmitted. For example, the packets can be simultaneously transmitted through two channels separated in the frequency domain. Specifically, the mobile terminal can simultaneously transmit the packets through two separate subcarrier sets of OFDM or may simultaneously transmit the packets based on two codes that can be identified on the same time/frequency.

Thereafter, when a response message to the packet for the main radio module is received, the mobile terminal can determine that a previously received wake-up packet is a wake-up packet transmitted from a legitimate source and perform the following process.

On the other hand, when a response message to the packet for the WUR module is received, the mobile terminal can determine that the previously received wake-up packet is not a wake-up packet transmitted from a legitimate source and determine that a problem with respect to security related to the wake-up packet has occurred. Accordingly, the mobile terminal can perform an identification change process. In addition, the mobile terminal can immediately perform the identification change process upon determining that the wake-up packet is not a wake-up packet transmitted from a legitimate source or may perform the identification change process upon determining that a specific number or more of wake-up packets transmitted for a specific time are not wake-up packets transmitted from the legitimate source. For example, when it is determined that three wake-up packets transmitted for a specific time are not wake-up packets transmitted from the legitimate source, the mobile terminal can perform the identification change process. When the identification change process has been successfully performed, the main radio module of the WUR device of the legitimate source can operate in a turn-off state and the WUR module of the WUR device can operate in a turn-on state. On the other hand, when the identification change process has not been successfully performed, the identification change process may be repeatedly performed until it is successfully performed. The aforementioned identification process can be performed as follows.

The wake-up packet may include a 48-bit MAC ID and a 14-bit AID as an address system indicating a reception terminal that receives the wake-up packet and a transmission terminal that transmits the wake-up packet. The 48-bit of the MAC ID may be an excessively large number of bits for the wake-up packet having a limited payload size. Further, the same AID may be allocated to different STAs in an OBSS environment.

Accordingly, an N-bit WUR address field including the MAC ID and the AID can be used for the identification change process. For example, the N bits may be 16 bits, 20 bits or 24 bits. The WUR address field may include a first field and a second field, and the first field and the second field may be fields having K1 bits and K2 bits. Accordingly, the N bits can be represented by the following equation.

$$N = K1 + K2 \quad \text{[Equation 1]}$$

Figure 14:
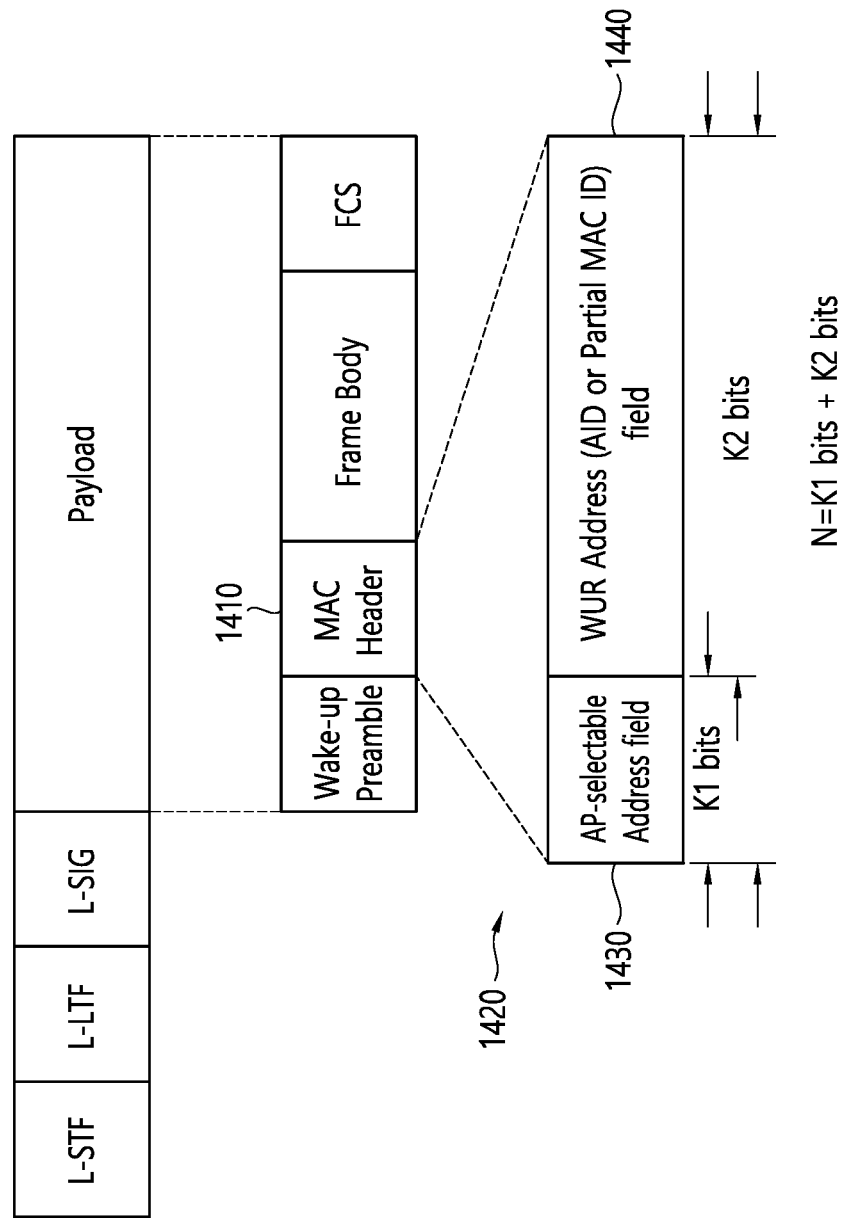
FIG. 14 illustrates an example of a wake-up packet format including the WUR address field.

FIG. 14 illustrates an example of a wake-up packet format including the WUR address field. Referring to FIG. 14, the WUR address field 1420 may be included in a MAC header field 1410. The WUR address field 1420 may include the first field 1430 and the second field 1440.

The first field 1430 having the K1 bits may be selected through the mobile terminal of the user and the second field 1440 having the K2 bits may be derived in a conventional address system. That is, the second field 1440 may be the entire AID or a part of the MAC ID. For example, when the N is 20 bits, K2 may be 14 bits and K1 may be 6 bits.

Information represented by the first field 1430 selected through the mobile terminal, that is, the value of the first field 1430, can be shared by other terminals in an OBSS, and thus the same first field 1430 can be prevented from being allocated by other terminals in the OBSS. In addition, when wrong wake-up exceeding a specific threshold value is generated due to collision, the WUR device can request a wake-up packet identification change process and the mobile terminal can reselect the first field 1430. Meanwhile, since the WUR operation is used with low power, a simple modulation method can be used for the first field 1430 for power saving. Accordingly, uniform distribution of "1" in the first field 1430 may be more appropriate. For example, when the identification change process is performed, the first field 1430 can change from 00001111 to 10101010. After addressing for the WUR address field 1420, interleaving can be applied to the WUR address field 1420.

Figure 15:
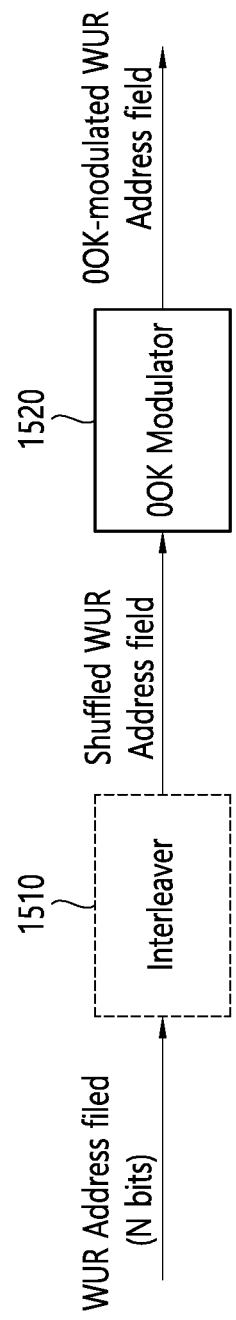
FIG. 15 illustrates an example of a transmission terminal which transmits the WUR address field.

FIG. 15 illustrates an example of a transmission terminal which transmits the WUR address field. Referring to FIG. 15, the transmission terminal may include an interleaver 1510 and an OOK modulator 1520.

The interleaver 1510 performs an operation of dispersing successive bit signals on a radio resource (e.g., time and/or frequency) in order to prevent burst error due to fading. The interleaver 1510 can derive a shuffled WUR address field by performing the operation of dispersing the generated N-bit WUR address field on a radio resource (e.g., time and/or frequency).

The shuffled WUR address field can be input to the OOK modulator 1520. The OOK modulator 1520 can modulate the shuffled WUR address field input thereto according to the above-described OOK method and output an OOK-modulated WUR address field.

Figure 16:
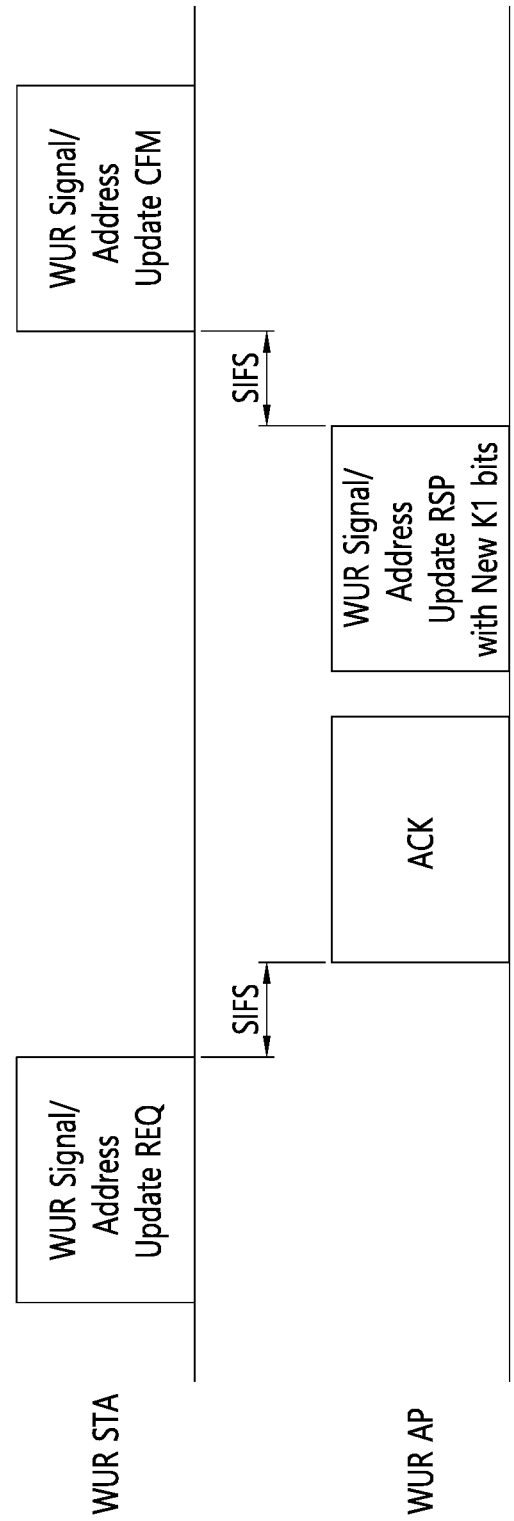
FIG. 16 illustrates an identification change process with respect to a WUR device and a mobile terminal of a user.

FIG. 16 illustrates an identification change process with respect to a WUR device and a mobile terminal of a user. Referring to FIG. 16, the WUR device can transmit a wake-up packet and an address update request message to the mobile terminal. The address update request message may be referred to as an identification change request message. When the wake-up packet and the address update request message are received, the mobile terminal can transmit a wake-up packet including ACK and a WUR address field updated with a new K1-bit first field. Then, the WUR device can perform a WUR process based on the updated WUR address field. Although FIG. 16 illustrates the identification change started by the WUR device, the identification change process may be started by the mobile terminal.

Figure 17:
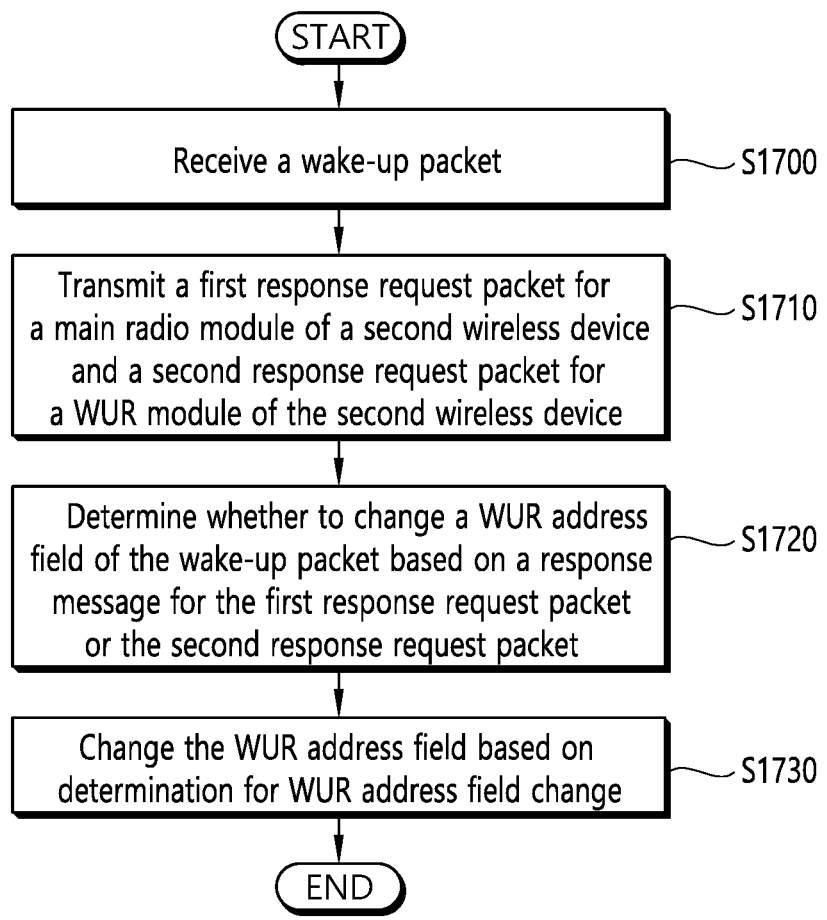
FIG. 17 schematically illustrates a method for transmitting a packet by a first wireless device in a wireless LAN system according to the present disclosure.

FIG. 17 schematically illustrates a method for transmitting a packet by a first wireless device in a wireless LAN system according to the present disclosure. Here, the first wireless device may be the above-described transmission terminal of the user and may include a processor and a wake-up radio (WUR) module. Specifically, S1700 of FIG. 17 may be performed by the WUR module of the first wireless device and S1710 to S1730 may be performed by the processor of the first wireless device, for example.

Referring to FIGS. 1 to 17, in step S1700, the first wireless device including the WUR module and the processor can receive a wake-up packet. The WUR module of the first wireless device can operate in a turn-on state and the processor can operate in a deactivated state. The WUR module of the first wireless device can receive the wake-up packet.

In step S1710, the first wireless device can transmit a first response request packet for a main radio module of a second wireless device and a second response request packet for a WUR module of the second wireless device. Here, the second wireless device may be a wireless device managed by the transmission terminal of the user. Further, the second wireless device can include the WUR module and the main radio module. The first response request packet may be a packet for requesting a response message of the main radio module of the second wireless device and the second response request packet may be a packet for requesting a response message of the WUR module of the second wireless device.

In step S1720, the first wireless device can determine whether to change the WUR address field of the wake-up packet based on a response message for the first response request packet or the second response request packet.

For example, the wireless device can determine that the WUR address field is not changed when the response message for the first response request packet is received. When the (legitimate) second wireless device has transmitted the wake-up packet, the response message for the first response request packet may be received and the response message for the second response request packet may not be received because the main radio module of the second wireless device operates in a turn-on state and the WUR module operates in a turn-off state. Accordingly, when the response message for the first response request packet is received, the first wireless device can determine that the wake-up packet has been transmitted from the second wireless device and determine that the WUR address field is not changed.

In addition, when the second response message for the second response request packet is received, the first wireless device can determine that the WUR address field is changed. When the wake-up packet has been transmitted from another device instead of the (legitimate) second wireless device, the response message for the second response request packet may be received and the response message for the first response request packet may not be received because the main radio module of the second wireless device operates in a turn-off state and the WUR module operates in a turn-on state. Accordingly, when the response message for the second response request packet is received, the first wireless device can determine that the wake-up packet has not been transmitted from the second wireless device and determine that the WUR address field is changed.

Further, when a specific number of response messages for the second response request packet are received for a specific time, for example, the first wireless device can determine that the WUR address field is changed. That is, a plurality of wake-up packets may be received, and when response messages for the second response request packets with respect to the plurality of wake-up packets are received for a specific time, it is possible to determine that the WUR address field is changed. Here, the specific time and the specific number may be derived as predetermined values. For example, the specific number may be 3.

In step S1730, the first wireless device can change the WUR address field when it is determined that the WUR address field is changed.

For example, the WUR address field may be included in the MAC header field of the wake-up field and may include the first field and the second field. Here, the number of bits of the WUR address field may be N, the number of bits of the first field may be K1, and the number of bits of the second field may be K2. For example, N may be one of 16, 20 and 24. When the number N of bits of the WUR address field is 20, for example, K1 may b 6 and K2 may b 14. That is, when the number of bits of the WUR address field is 20, the number of bits of the first field may be 6 and the number of bits of the second field may be 14. Further, the second field may be derived in a conventional address system. For example, the second field may be an AID or a specific part of a MAC ID.

When the response message for the second response request packet is received, the first wireless device can determine that the WUR address field is changed. For example, the first wireless device can reselect the first field. That is, the first wireless device can change the value of the first field. Information represented by the first field, that is, the value of the first field, can be shared by other terminals in the OBSS and thus a first field representing the same information, that is, a first field having the same value as the first field can be prevented from being allocated by another terminal.

Meanwhile, when the WUR address field is changed, the first wireless device can generate a wake-up packet including the changed WUR address field and transmit the wake-up packet including the changed WUR address field.

Figure 18:
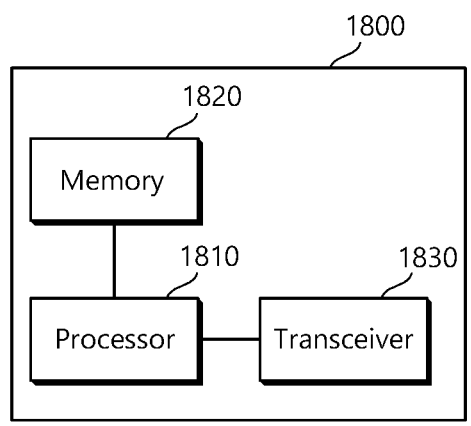
FIG. 18 is a block diagram of a wireless device to which the present embodiment is applicable.

FIG. 18 is a block diagram of a wireless device to which the present embodiment is applicable.

Referring to FIG. 18, the wireless device is an STA that can implement the above-described embodiment and can operate as an AP or a non-STA. In addition, the wireless device may correspond to the aforementioned user or the transmission terminal that transmits signals to the user.

The wireless device of FIG. 18 includes a processor 1810, a memory 1820 and a transceiver 1830 as illustrated. The processor 1810, the memory 1820 and the transceiver 1830 may be realized as separate chips or at least two blocks/functions thereof may be realized as a single chip.

The transceiver 1830 includes a transmitter and a receiver, and only the operation of any one of the transmitter and the receiver may be performed when a specific operation is executed or both the operations of the transmitter and the receiver may be performed. In addition, the transceiver 1830 may include the aforementioned WUR module and one or more antennas for transmitting and/or receiving RF signals.

The transceiver 1830 may include an amplifier for amplifying received signals and/or transmitted signals and a bandpass filter for transmission through a specific frequency band.

The processor 1810 can realize functions, processes and/or methods proposed in the specification. For example, the processor 1810 may perform operations according to the above-described embodiment. That is, the processor 1810 can perform the operations described in the embodiment illustrated in FIGS. 1 to 17.

The processor 1810 may include an application-specific integrated circuit (ASIC), other chipsets, a logic circuit, a data processor and/or a converter for converting a baseband signal and an RF signal into each other. The memory 1820 may include a read-only memory (ROM), a random access memory (RAM), a flash memory, a memory card, a storage medium and/or other storage devices.

Figure 19:
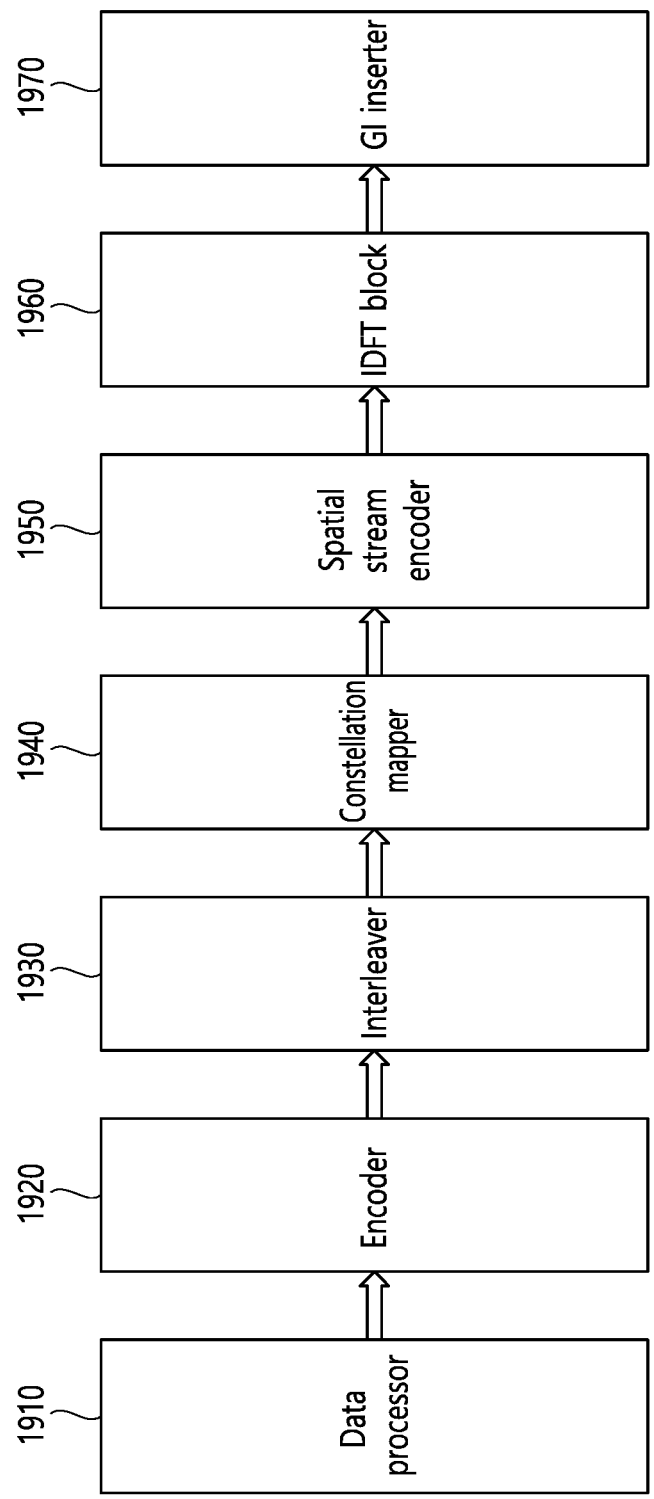
FIG. 19 is a block diagram of an example of a device included in a processor.

FIG. 19 is a block diagram of an example of a device included in the processor. Although the example of FIG. 19 will be described based on blocks for a transmitted signal for convenience of description, it is obvious that a received signal can be processed using the blocks.

An illustrated data processor 1910 generates transmitted data (control data and/or user data) corresponding to a transmitted signal. The output of the data processor 1910 can be input to an encoder 1920. The encoder 1920 can perform encoding using binary convolutional code (BCC) or low-density parity-check (LDPC). At least one encoder 1920 may be provided and the number of encoders 1920 can be determined according to various types of information (e.g., the number of data streams).

The output of the encoder 1920 can be input to an interleaver 1930. The interleaver 1930 performs an operation of dispersing successive bit signals on a radio resource (e.g., time and/or frequency) in order to prevent burst error due to fading or the like. At least one interleaver 1930 may be provided and the number of interleavers 1930 can be determined according to various types of information (e.g., the number of spatial streams).

The output of the interleaver 1930 can be input to a constellation mapper 1940. The constellation mapper 1940 performs constellation mapping such as BPSK (biphase shift keying), QPSK (quadrature phase shift keying), and n-QAM (quadrature amplitude modulation).

The output of the constellation mapper 1940 can be input to a spatial stream encoder 1950. The spatial stream encoder 1950 performs data processing in order to transmit a transmitted signal through at least one spatial stream. For example, the spatial stream encoder 1950 can perform at least one of STBC (space-time block coding), CSD (cyclic shift diversity) insertion, and spatial mapping for the transmitted signal.

The output of the spatial stream encoder 1950 can be input to an IDFT block 1960. The IDFT block 1960 performs IDFT (inverse discrete Fourier transform) or IFFT (inverse Fast Fourier transform).

The output of the IDFT block 1960 is input to a guard interval (GI) inserter 1970 and the output of the GI inserter 1970 is input to the transceiver 1830 of FIG. 18.

Figure 20:
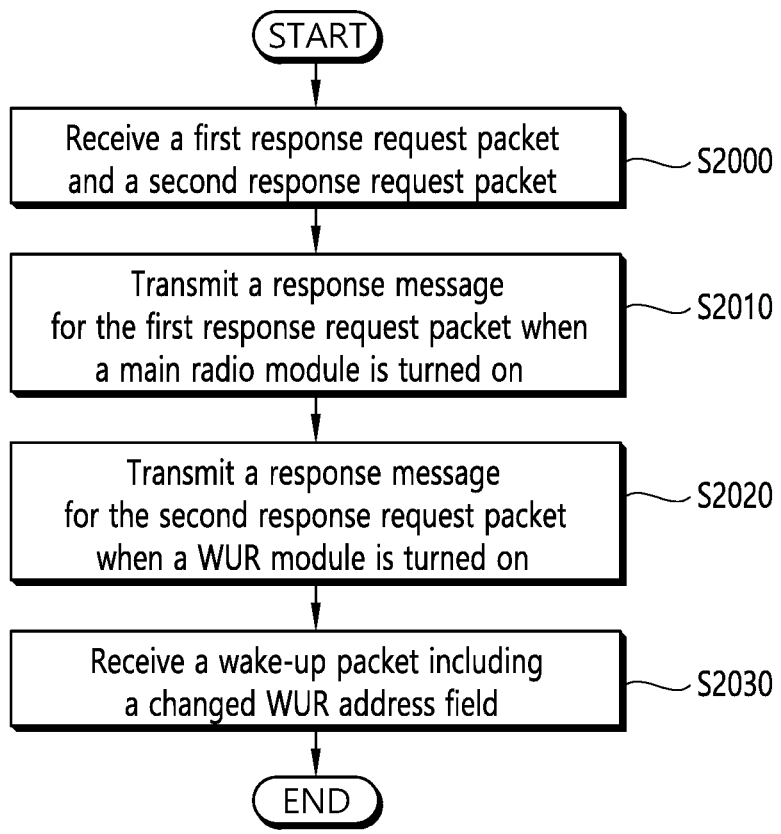
FIG. 20 schematically illustrates a method for receiving a packet by a second wireless device in a wireless LAN system according to the present disclosure.

FIG. 20 schematically illustrates a method for receiving a packet by a second wireless device in a wireless LAN according to the present disclosure. Here, the second wireless device may be a legitimate terminal managed by the aforementioned first wireless device. Further, the second wireless device may include a wake-up radio (WUR) module and a main radio module.

Referring to FIGS. 1 to 20, the second wireless device can receive a first response request packet and a second response request packet in step S2000. The first response request packet may be a packet for requesting a response message of the main radio module of the second wireless device and the second response request packet may be a packet for requesting a response message of the WUR module of the second wireless device.

In step S2010, the second wireless device can transmit the response message for the first response request packet when the main radio module of the second wireless device is turned on.

In step S2020, the second wireless device can transmit the response message for the second response request packet when the WUR module of the second wireless device is turned on. The response message for the second response request packet may be a message for requesting change of the WUR address field of the wake-up packet. For example, the WUR address field may be included in the MAC header field of the wake-up field and may include the first field and the second field. Here, the number of bits of the WUR address field may be N, the number of bits of the first field may be K1, and the number of bits of the second field may be K2. For example, N may be one of 16, 20 and 24. When the number N of bits of the WUR address field is 20, for example, K1 may b 6 and K2 may b 14. That is, when the number of bits of the WUR address field is 20, the number of bits of the first field may be 6 and the number of bits of the second field may be 14. Further, the second field may be derived in the conventional address system. For example, the second field may be an AID or a specific part of a MAC ID.

In step S2030, when the second wireless device has transmitted the response message for the second response request packet, the second wireless device can receive a wake-up packet including a changed WUR address field. The changed WUR address field can be a WUR address field in which the value of the first field has been changed. When the wake-up packet including the changed WUR address field is received, the second wireless device can instruct an operation with respect to reception of the wake-up packet to be performed. For example, the main radio module of the second wireless device can transmit a reassociation frame to the first wireless device.

When the second wireless device has transmitted a specific number of response messages for second response request packet for a specific time, the second wireless device may receive a wake-up packet including a changed WUR address field. Here, the specific time and the specific number may be derived as predetermined values. For example, the specific number may be 3.

According to the above-described present disclosure, the first wireless device of the user can determine whether a received wake-up packet is a wake-up packet transmitted from a terminal other than the legitimate second wireless device managed by the first wireless device and thus can efficiently prevent waste of power caused by a wake-up packet received from a terminal other than the legitimate second wireless device.

Furthermore, according to the present disclosure, when a wake-up packet is received from a terminal other than the legitimate second wireless device managed by the first wireless device, the WUR address field of the wake-up packet can be changed. Accordingly, it is possible to efficiently prevent waste of power caused by the terminal other than the legitimate second wireless device.

The above-described steps may be omitted or replaced with other steps of performing similar/identical operations according to embodiments.

In the above-described embodiment, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

When embodiments are realized as software in the present disclosure, the above-described methods can be realized by modules (processes, functions, etc.) which execute the above-described functions. The modules can be stored in a memory and executed by a processor. The memory may be provided inside or outside the processor and connected to the processor through various known means. The processor may include application-specific integrated circuits (ASICs), other chipsets, logic circuits, and/or data processors. The memory may include a read-only memory (ROM), a random access memory (RAM), a flash memory, a memory card, a storage medium and/or other storage devices.

What is claimed is:

1. A method for transmitting a packet in a wireless LAN system, the method comprising:
   receiving, by a first wireless device, a wake-up packet;
   transmitting, by the first wireless device, a first response request packet for a main radio module of a second wireless device and a second response request packet for a wake-up radio (WUR) module of the second wireless device;
   determining, by the first wireless device, whether to change a WUR address field of the wake-up packet based on a response message for the first response request packet or the second response request packet;
   determining, by the first wireless device, that the WUR address field of the wake-up packet is changed when the response message for the second response request packet is received,
   wherein the WUR address field is included in a medium access control (MAC) header field of the wake-up field and includes a first field and a second field,
   wherein the first field is selected by the first wireless device and shared by other wireless devices in an overlapping basic service set (OBSS), and
   wherein the second field is entire association identifier (AID) or a part of a medium access control identifier (MAC ID); and
   reselecting, by the first wireless device, the first field when the received wake-up packet is determined not a wake-up packet transmitted from a legitimate source.

2. The method of claim 1, further comprising:
   generating a wake-up packet including the changed WUR address field; and
   transmitting the wake-up field including the changed WUR address field.

3. The method of claim 1, wherein the first response request packet is a packet for requesting a response message of the main radio module of the second wireless device, and the second response request packet is a packet for requesting a response message of the WUR module of the second wireless device.

4. The method of claim 3, further comprising: determining that the WUR address field of the wake-up packet is not changed when the response message for the first response request packet is received.

5. The method of claim 1, wherein the WUR address field is included in a medium access control (MAC) header field of the wake-up field and includes a first field and a second field.

6. The method of claim 5, wherein the changing of the WUR address field comprises changing the value of the first field.

7. The method of claim 5, wherein the number of bits of the WUR address field is one of 16, 20 and 24.

8. A first wireless device transmitting a packet in a wireless LAN system, comprising:
   a wake-up radio (WUR) module configured to receive a wake-up packet; and
   a processor configured to:
      transmit a first response request packet for a main radio module of a second wireless device and a second response request packet for a WUR module of the second wireless device,
      determine whether to change a WUR address field of the wake-up packet based on a response message for the first response request packet or the second response request packet,
      determine that the WUR address field of the wake-up packet is changed when the response message for the second response request packet is received,
   wherein the WUR address field is included in a medium access control (MAC) header field of the wake-up field and includes a first field and a second field,
   wherein the first field is selected by the first wireless device and shared by other wireless devices in an overlapping basic service set (OBSS), and
   wherein the second field is entire association identifier (AID) or a part of a medium access control identifier (MAC ID), and
   reselect the first field when the received wake-up packet is determined not a wake-up packet transmitted from a legitimate source.

9. The first wireless device of claim 8, wherein the processor generates a wake-up packet including the changed WUR address field and transmits the wake-up field including the changed WUR address field.

10. The first wireless device of claim 8, wherein the first response request packet is a packet for requesting a response message of the main radio module of the second wireless device, and the second response request packet is a packet for requesting a response message of the WUR module of the second wireless device.

11. The first wireless device of claim 10, wherein the processor determines that the WUR address field of the wake-up packet is not changed when the response message for the first response request packet is received.

12. The first wireless device claim 11, wherein the processor changes the value of the first field.

13. The first wireless device of claim 11, wherein the number of bits of the WUR address field is one of 16, 20 and 24.

14. The first wireless device of claim 11,
   wherein the WUR module receives a plurality of wake-up packets, and
   wherein the processor determines that the WUR address field of the wake-up packet is changed when a specific number or more response messages for the second response request packet are received for a specific time.

* * * * *